United States Patent
Wyman (10) Patent No.: US 7,466,361 B2
(45) Date of Patent: Dec. 16, 2008

(54) METHOD AND SYSTEM FOR SUPPORTING MOTION IN A MOTION ADAPTIVE DEINTERLACER WITH 3:2 PULLDOWN (MAD32)

(76) Inventor: Richard H. Wyman, 1269 Lakeside Dr., #3098, Sunnyvale, CA (US) 94085

( * ) Notice: Subject to any disclaimer, the term of this patent is extended or adjusted under 35 U.S.C. 154(b) by 642 days.

(21) Appl. No.: 11/027,365

(22) Filed: Dec. 30, 2004

(65) Prior Publication Data

US 2006/0077305 A1     Apr. 13, 2006

Related U.S. Application Data

(60) Provisional application No. 60/617,455, filed on Oct. 8, 2004.

(51) Int. Cl.
*H04N 11/00* (2006.01)
*H04N 5/14* (2006.01)
(52) U.S. Cl. .......................... 348/452; 348/701
(58) Field of Classification Search ......... 348/448–452, 348/441, 700, 701
See application file for complete search history.

(56) References Cited

U.S. PATENT DOCUMENTS

| | | | | |
|---|---|---|---|---|
| 5,027,201 A * | 6/1991 | Bernard | ................. | 348/702 |
| 5,159,451 A * | 10/1992 | Faroudja et al. | ............. | 348/448 |
| 5,291,280 A * | 3/1994 | Faroudja et al. | ........ | 375/240.12 |
| 5,353,118 A * | 10/1994 | Cho | ........................... | 348/451 |
| 5,661,525 A * | 8/1997 | Kovacevic et al. | .......... | 348/452 |
| 5,912,707 A * | 6/1999 | Kim | ...................... | 375/240.16 |
| 6,108,487 A * | 8/2000 | Takeda | ....................... | 386/124 |
| 6,188,437 B1 * | 2/2001 | Webb et al. | .................. | 348/448 |
| 6,614,485 B2 * | 9/2003 | Shin et al. | .................... | 348/452 |
| 2002/0027610 A1 * | 3/2002 | Jiang et al. | .................. | 348/448 |
| 2003/0052995 A1 * | 3/2003 | Hsu et al. | .................... | 348/448 |
| 2003/0118109 A1 * | 6/2003 | Kelly et al. | ............. | 375/240.21 |
| 2003/0156301 A1 * | 8/2003 | Kempf et al. | ............... | 358/486 |
| 2007/0177056 A1 * | 8/2007 | Zhou et al. | .................. | 348/452 |

* cited by examiner

*Primary Examiner*—Victor R Kostak
(74) *Attorney, Agent, or Firm*—McAndrews Held & Malloy, Ltd.

(57) ABSTRACT

A system and method that determine the motion of an absent pixel in a video image. The method may comprise determining the spatial motion and the temporal motion of the absent pixel. The method may also comprise selecting the stronger of the two determined motions. Determining the spatial motion may comprise selecting one of two methods for determining spatial motion. Determining the temporal motion may comprise selecting one of three methods for determining temporal motion. Selection of the methods used may be determined by a user of the system.

24 Claims, 7 Drawing Sheets

METHOD AND SYSTEM FOR SUPPORTING MOTION IN A MOTION ADAPTIVE DEINTERLACER WITH 3:2 PULLDOWN (MAD32)

RELATED APPLICATIONS

This patent application makes reference to, claims priority to and claims benefit from U.S. Provisional Patent Application Ser. No. 60/617,455, entitled "Method and System for Supporting Motion in a Motion Adaptive Deinterlacer with 3:2 Pulldown (MAD32)," filed on Oct. 8, 2004, the complete subject matter of which is hereby incorporated herein by reference, in its entirety.

This application makes reference to:
U.S. Provisional Patent Application Ser. No. 60/540,717, filed on Jan. 30, 2004;
U.S. application Ser. No. 10/945,769 filed Sep. 21, 2004;
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,817 filed Sep. 21, 2004;
U.S. application Ser. No. 10/945,729 filed Sep. 21, 2004;
U.S. application Ser. No. 10/945,828 filed Sep. 21, 2004;
U.S. application Ser. No. 10/946,152 filed Sep. 21, 2004;
U.S. application Ser. No. 10/871,649 filed Jun. 17, 2004;
U.S. application Ser. No. 10/946,153 filed Sep. 21, 2004;
U.S. application Ser. No. 10/945,645 filed Sep. 21, 2004;
U.S. Provisional Patent Application Ser. No. 60/616,071 filed Oct. 5, 2004;
U.S. patent application Ser. No. 11/051,415 filed Feb. 4, 2005;
U.S. patent application Ser. No. 11/026,369 filed Dec. 30, 2004; and
U.S. patent application Ser. No. 11/027,140 filed Dec. 30, 2004.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video system applications, a picture is displayed on a television or a computer screen by scanning an electrical signal horizontally across the screen one line at a time using a scanning circuit. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of the lines that make up the image or picture and the associated synchronization signals that allow the scanning circuit to trace the lines from left to right and from top to bottom.

There may be two different types of picture or image scanning in a video system. For some television signals, the scanning may be interlaced video format, while for some computer signals the scanning may be progressive or non-interlaced video format. Interlaced video occurs when each frame is divided into two separate sub-pictures or fields. These fields may have originated at the same time or at subsequent time instances. The interlaced picture may be produced by first scanning the horizontal lines for the first field and then retracing to the top of the screen and then scanning the horizontal lines for the second field. The progressive, or non-interlaced, video format may be produced by scanning all of the horizontal lines of a frame in one pass from top to bottom.

In video compression, communication, decompression, and display, there has been for many years problems associated with supporting both interlaced content and interlaced displays along with progressive content and progressive displays. Many advanced video systems support either one format or the other format. As a result, deinterlacers, devices or systems that convert interlaced video format into progressive video format, have become an important component in many video systems.

However, deinterlacing takes fields from interlaced video and coverts them into frames of progressive video, at double the display rate. Certain problems may arise concerning the motion of objects from image to image during deinterlacing. Objects that are in motion are encoded differently in interlaced fields and progressive frames. Video images or pictures, encoded in interlaced video format, containing little motion from one image to another may be de-interlaced into progressive video format with virtually no problems or visual artifacts. However, visual artifacts become more pronounced with video images containing a lot of motion and change from one image to another, when converted from interlaced to progressive video format. As a result, some video systems were designed with motion adaptive deinterlacers.

Areas in a video image that are static are best represented with one approximation. Areas in a video image that are in motion are best represented with a different approximation. A motion adaptive deinterlacer attempts to detect motion so as to choose the correct approximation in a spatially localized area. An incorrect decision of motion in a video image results in annoying visual artifacts in the progressive output thereby providing an unpleasant viewing experience. Several designs have attempted to find a solution for this problem but storage and processing constraints limit the amount of spatial and temporal video information that may be used for motion detection.

Frame rate defines how many pictures or frames of video information are displayed per second and the general units are frames per second (fps). In general, movies are shot at a frame rate of 24 fps. However, the standard promulgated in the United States by the National Television System Committee (NTSC) requires that information be displayed at a frame rate of 29.97 fps. Accordingly, the frame rate of movies shot at 24 fps must be changed in order to for them to be correctly displayed on NTSC compliant televisions. This process of changing the frame rate of movies from 24 fps to 29.97 fps is called telecine. Inverse telecine (IVTC) is the process utilized to transform movies from NTSC's frame rate of 29.97 fps back to a frame rate of 24 fps.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that determine motion information of an absent pixel in a current video image. The method may comprise selecting a first method to determine spatial motion of an absent pixel; determining the spatial motion of the absent pixel; selecting a second method to determine temporal motion of the absent pixel; determining the temporal motion of the absent pixel; and determining the motion of the absent pixel utilizing the determined spatial motion and the temporal motion of the absent pixel.

The first method may comprise utilizing a plurality of pixels in a present line immediately above and a present line immediately below the absent pixel. The plurality of pixels may comprise a first pixel immediately above the absent pixel; a second pixel at the same location as the first pixel in a video image prior to the current video image; a third pixel immediately below the absent pixel; and a fourth pixel at the same location as the third pixel in a video image prior to the current video image.

The first method may further comprise determining a first value comprising the minimum of the difference between the first and second pixels and the difference between the third and fourth pixels, determining a second value comprising the maximum of the difference between the first and second pixels and the difference between the third and fourth pixels, and selecting one of the first and second value based on a selected level of sensitivity to motion.

The second method may comprise utilizing a plurality of pixels in the same location as the absent pixel from video images prior to and subsequent to the current video image. The plurality of pixels may comprise a first pixel from a first video image immediately subsequent to the current video image; a second pixel from a second video image immediately prior to the current video image; and a third pixel from a video image prior to the second video image. The plurality of pixels may further comprise a fourth pixel immediately to the left of the first pixel; a fifth pixel immediately to the left of the second pixel; a sixth pixel immediately to the left of the third pixel; a seventh pixel immediately to the right of the first pixel; an eighth pixel immediately to the right of the second pixel; and a ninth pixel immediately to the right of the third pixel.

The second method may further comprise determining a first value comprising the difference between the maximum and the minimum of the first, second, and third pixels; determining a second value comprising the difference between the maximum and the minimum of the fourth, fifth, and sixth pixels; determining a third value comprising the difference between the maximum and the minimum of the seventh, eighth and ninth pixels; and selecting a combination of the first, second and third values based on a selected level of sensitivity to motion.

The system comprises at least one processor capable of performing the method as described hereinabove that determines motion information of an absent pixel in a current video image.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to processing video signals. More specifically, certain embodiments of the invention relate to a method and system for supporting motion in a motion adaptive deinterlacer with 3:2 pulldown (MAD32).

Certain aspects of the invention may be found in a method and system for pixel constellations for motion detection in a motion adaptive deinterlacer. The value of an output pixel in an absent line in a current field may be determined based on a constellation of pixels. An absent line is a video line that may be created from a source video field. The constellation of pixels may comprise a plurality of horizontal pixels in at least one of the present lines above and/or at least one of the present lines below the first absent line of the current field. The constellation of pixels may also comprise a plurality of pixels from at least one of the present lines in fields that occur prior to the current field and/or fields that occur after the current field. A present line is a video line that may have originated in the source video field. Determining the output pixel value may be based on stored motion information from at least one of the fields that occurred prior to the current field.

Figure 1:
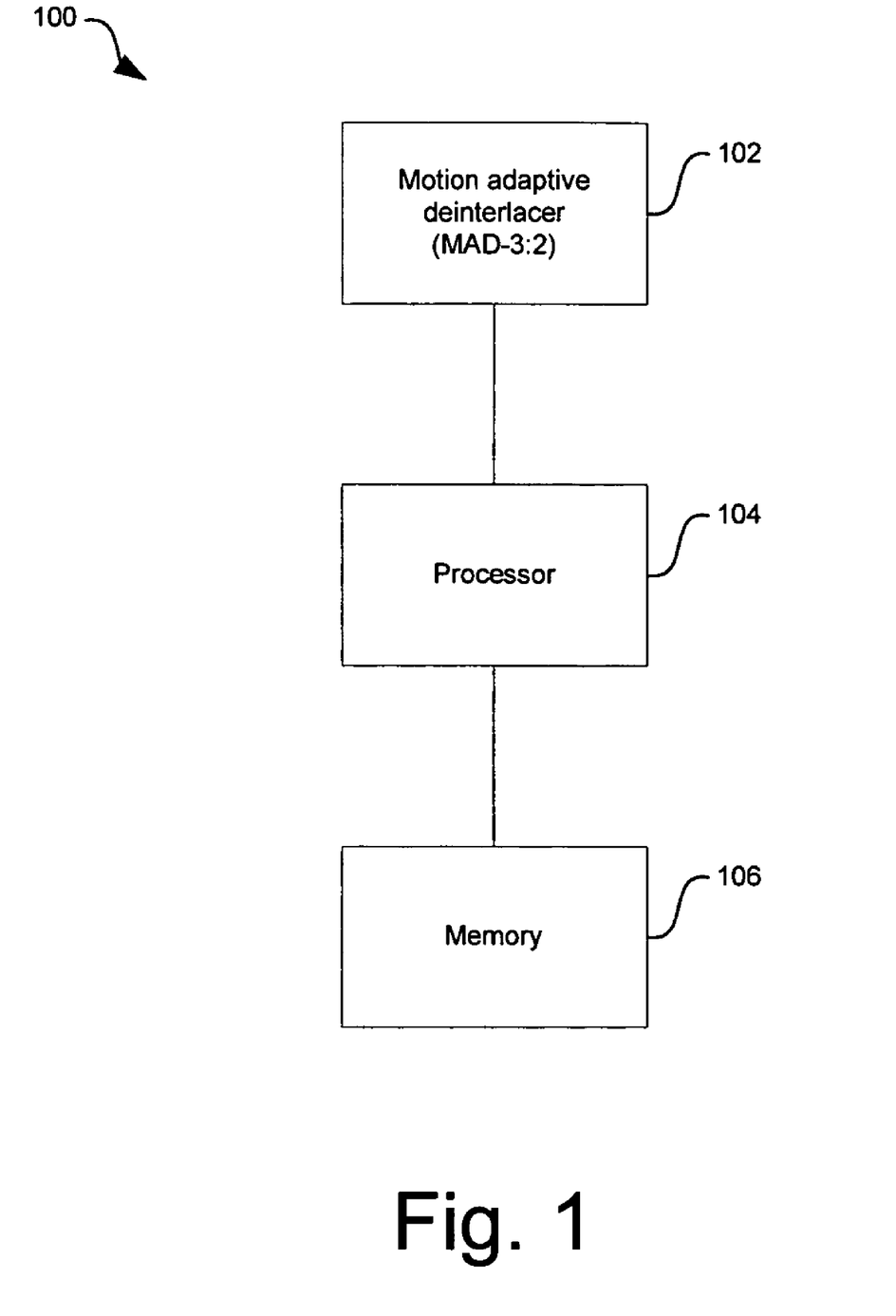
FIG. 1 illustrates a block diagram of an exemplary architecture for positioning of a motion adaptive deinterlacer, in accordance with an embodiment of the present invention.

FIG. 1 illustrates a block diagram of an exemplary architecture for positioning of a motion adaptive deinterlacer, in accordance with an embodiment of the present invention. Referring to FIG. 1, the deinterlacer system 100 may comprise a motion adaptive deinterlacer (MAD-3:2) 102, a processor 104, and a memory 106. The MAD-3:2 102 may comprise suitable logic, code, and/or circuitry that may be adapted to deinterlace video fields. The processor 104 may comprise suitable logic, code, and/or circuitry that may be adapted to control the operation of the MAD-3:2 102 and to transfer control information and/or data to and from the memory 106. The memory 106 may comprise suitable logic, code, and/or circuitry that may be adapted to store control information, data, information regarding current video fields, and/or information regarding prior video fields.

The MAD-3:2 102 may be capable of reverse 3:2 pull-down and 3:2 pull-down cadence detection which may be utilized in a video network (VN). The MAD-3:2 102 may be adapted to acquire interlaced video fields from one of a plurality of video sources in the video network and convert the acquired interlaced video fields into progressive frames, at double the display rate, in a visually pleasing manner.

The MAD-3:2 102 may be adapted to accept interlaced video input and to output deinterlaced or progressive video to a video bus utilized by the video network. The MAD-3:2 102 may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field-by-field basis up to, for example, a width of 720. The MAD-3:2 102 may be adapted to smoothly blend various approximations for the missing pixels to prevent visible contours produced by changing decisions. A plurality of fields of video may be utilized to determine motion. For example, in an embodiment of the present invention, five fields of video may be utilized to determine motion. The MAD-3:2 102 may produce stable non-jittery video with reduced risk of visual artifacts due to motion being misinterpreted while also providing improved still frame performance. The MAD-3:2 102 may also provide additional fields per field type of quantized motion information which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided that reduces or eliminates jaggies in moving diagonal edges. The MAD-3:2 102 may provide reverse 3:2 pull-down for improved quality from film based sources. The MAD-3:2 102 may also be adapted to support a variety of sources.

In operation, the MAD-3:2 102 may receive interlaced fields and may convert those interlaced fields into progressive frames, at double the display rate. A portion of the information regarding fields that occurred prior to the current field being deinterlaced may be stored locally in the MAD-3:2. A portion of the information regarding fields that occurred after the current field being deinterlaced may also be stored locally in the MAD-3:2. A remaining portion of the information regarding fields that occurred prior to and after the current field may be stored in the memory 106.

The processor 104 may control the operation of the MAD-3:2 102, for example, it may select from a plurality of deinterlacing algorithms that may be provided by the MAD-3:2 102. The processor 104 may modify the MAD-3:2 102 according to the source of video fields. Moreover, the processor 104 may transfer to the MAD-3:2 102, information stored in the memory 106. The processor 104 may also transfer to the memory 106 any field-related information not locally stored in the MAD-3:2 102. The MAD-3:2 102 may then use information from the current field, information from previously occurring fields, and information from fields that occurred after the current field, to determine a motion-adapted value of the output pixel under consideration.

Figure 2:
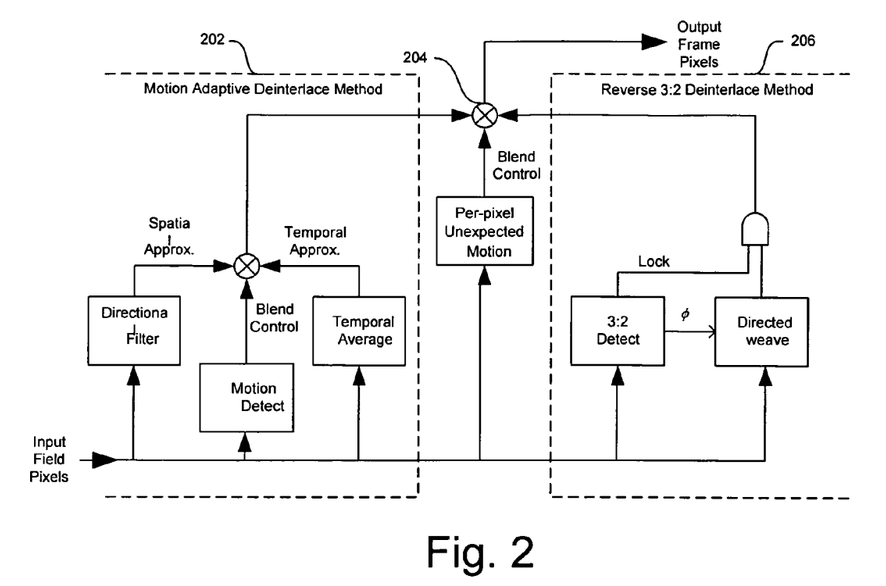
FIG. 2 illustrates a block diagram of an exemplary flow of the algorithm which may be utilized by the MAD-3:2 in FIG. 1, in accordance with an embodiment of the present invention.

FIG. 2 illustrates a block diagram of an exemplary flow of the algorithm which may be utilized by the MAD-3:2 in FIG. 1, in accordance with an embodiment of the present invention. Referring to FIG. 2, there is shown a data flow corresponding to the algorithm utilized for deinterlacing the luma (Y) component of video. The algorithm may effectively be divided into two halves. For example, diagrammed on the left portion of FIG. 2 is the motion adaptive deinterlacer (MAD) method 202 of deinterlacing and on the right portion, there is shown the reverse 3:2 pulldown method 206 of deinterlacing. For every output pixel, the MAD method 202, the reverse 3:2 pulldown method 206, or a blend 204 of the MAD method 202 and the reverse 3:2 pulldown method 206 may be utilized in order to determine a motion-adapted value of the output pixel under consideration.

U.S. Patent Application Ser. No. 60/540,614 filed Jan. 30, 2004 entitled "Improved Correlation Function for Signal Detection, Match Filters, and 3:2 Pulldown Detect," discloses an exemplary reverse 3:2 pulldown method 206 of deinterlacing, which may be utilized in connection with the present invention. Accordingly, U.S. Patent Application Ser. No. 60/540,614 filed Jan. 30, 2004 is hereby incorporated herein by reference in its entirety.

Figure 3:
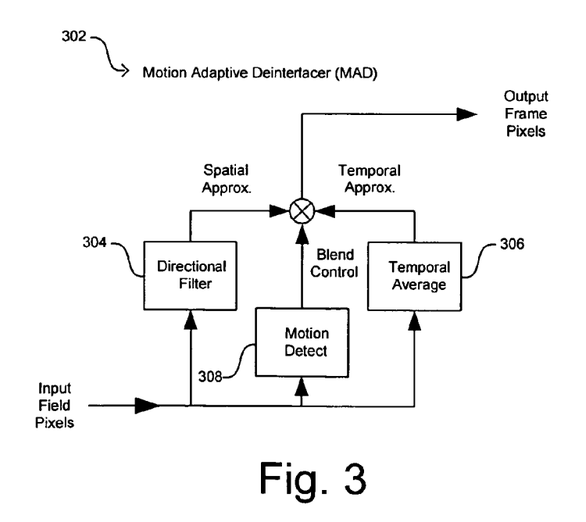
FIG. 3 illustrates an exemplary motion adaptive deinterlacer, in accordance with an embodiment of the present invention.

FIG. 3 illustrates an exemplary motion adaptive deinterlacer, in accordance with an embodiment of the present invention. The motion adaptive deinterlacer (MAD) 302 may comprise a directional filter 304, a temporal average 306, and a blender 308. The directional filter 304 may comprise suitable logic, code, and/or circuitry that may be adapted for spatially approximating the value of the output pixel. The temporal average 306 may comprise suitable logic, code, and/or circuitry that may be adapted for temporal approximation of the value of the output pixel. The blender 308 may comprise suitable logic, code, and/or circuitry that may be adapted to combine the temporal and spatial approximations of the value of the output pixel.

In operation, the MAD 302 may be used to perform the MAD method 202 of deinterlacing shown in FIG. 2. The MAD 302 may receive input field pixels from an interlaced video field and convert them into output frame pixels in a progressive frame, at double the display rate. The horizontal resolution of the input to the MAD 302 may change on a field-by-field basis. The MAD 302 may utilize a motion adaptive algorithm that may smoothly blend various approximations for the output pixels to prevent visible contours, which may be produced by changing decisions. In an embodiment of the present invention, it may be necessary to determine the amount of motion around each output pixel, to use an appropriate approximation for the output pixel. The MAD 302 may utilize the directional filter 304, the temporal average 306, and the blender 308 to obtain a motion-adapted value for the output pixel that is visually pleasing.

Figure 4:
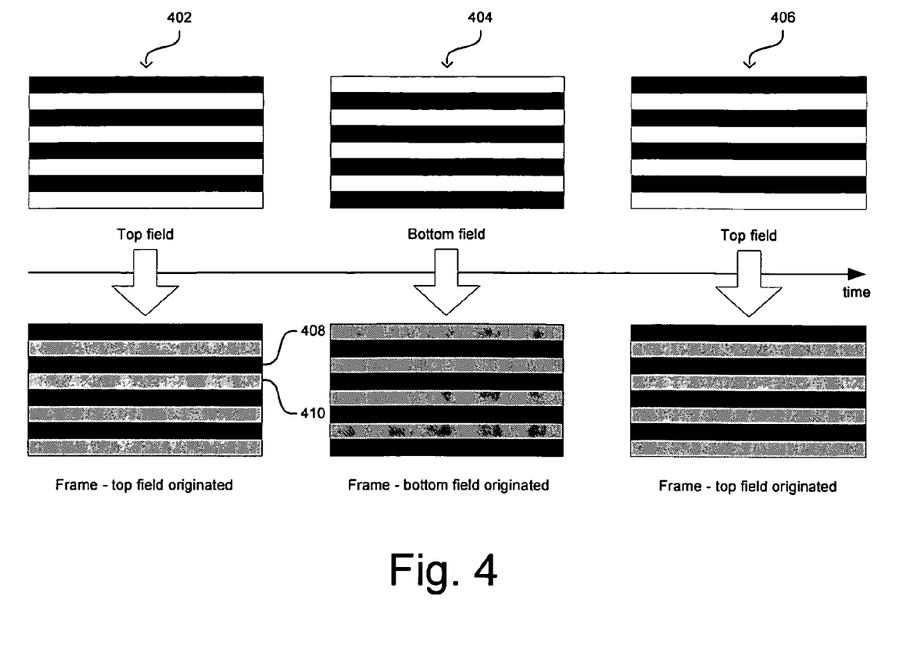
FIG. 4 illustrates an exemplary input and output of a deinterlacer, in accordance with an embodiment of the present invention.

FIG. 4 illustrates an exemplary input and output of a deinterlacer, in accordance with an embodiment of the present invention. Referring to FIG. 4, three fields are presented to the deinterlacer. The first field 402 is a top field, the second field 404 is a bottom field, and the third field 406 is a top field again. The first field 402 may be a bottom or top field, and the sequence of fields may alternate between top and bottom as appropriate depending on the first field 402. The deinterlacer may take the present lines in the field (black-colored lines in FIG. 4) and fill in the absent lines (clear lines in FIG. 4) to produce an output frame. The process of deinterlacing may be seen as taking one present line of pixels from the source field and producing two output lines of pixels. One line is the line that came from the source field and may be called the "present" line (black). An exemplary present line 408 is shown in FIG. 4 for the frame that originated from the first field 402. The other line is the line that needs to be created and may be called the "absent" line (hatched lines). An exemplary absent line 410 is shown in FIG. 4 for the frame that originated from the first field 402. This double output line pattern may then repeat to create the output frame. The pixels of the absent line may be computed using a deinterlacing procedure in accordance with an embodiment of the present invention. A line of present pixels may be output in parallel with a line of absent pixels. The two lines of output may make up the progressive frame lines.

Figure 5:
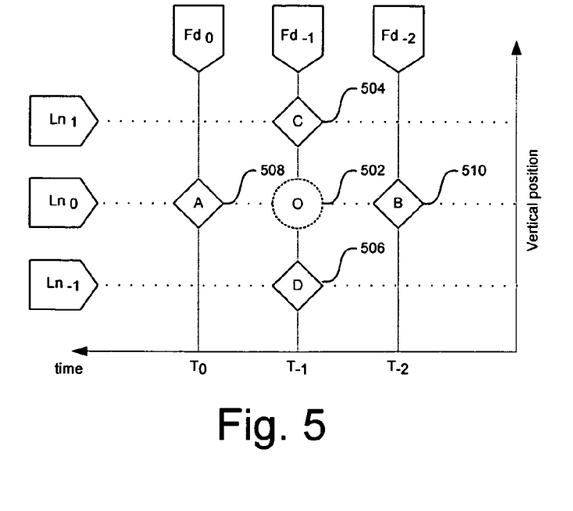
FIG. 5 illustrates an exemplary simple pixel constellation.

FIG. 5 illustrates an exemplary simple pixel constellation. Referring to FIG. 5, the current output field under consideration is a field $Fd_{-1}$ at time $T_{-1}$ and the current absent line to be determined is a line $Ln_0$. The most recent field to occur is a field $Fd_0$ at time $T_0$ and the earliest field shown is a field $Fd_{-2}$ at time $T_{-2}$. Generally, except for the first and last output lines of a frame, there will always be a present line $Ln_1$ of known pixels above and another present line $Ln_{-1}$ of known pixels below the absent line $Ln_0$ to be determined. Looking forward and backwards in time to the fields $Fd_0$ and $Fd_{-2}$ adjacent to the field $Fd_{-1}$, there will be present lines of known pixels at the same vertical position as the absent line $Ln_0$ currently being determined. Referring back to FIG. 5, each output pixel (O) 502 to be calculated in the absent line $Ln_0$, may be treated individually. Then, there will be one pixel above (C) 504 in present line $Ln_1$, of field $Fd_{-1}$, one pixel below (D) 506 in present line $Ln_{-1}$, of field $Fd_{-1}$, one pixel occurring forward in time (A) 508 in present line $Ln_0$ of field $Fd_0$, and one pixel occurring backwards in time (B) 510 in present line $Ln_0$ of field $Fd_{-2}$.

Each output frame generated by deinterlacing may have a height H and a width W, and for equations hereinafter, t will represent the time index, i will represent the height index where $0 \leq i < H$, and j will represent the width index where $0 \leq j < W$. For an output frame originated by a top field such as, for example, top field 402 or 406 in FIG. 4, when i MOD 2=0, the pixels in a line are provided from a present line in a source field, and when i MOD 2=1 the line corresponds to an absent line and the pixels in that line are determined. Conversely, in an output frame originated by a bottom field such as, for example, bottom field 404 in FIG. 4, when i MOD 2=1 the pixels in a line are provided from a present line in a source field, and when i MOD 2=0 the line corresponds to an absent line and the pixels in that line are determined. Considering just luma (Y) for the bottom field originated example, the output pixel O 502 to be created is such that:

$O = Y_O = Y(t,i,j)$ with $0 \leq i < H$, $iMOD2 \equiv O$ and $0 \leq j < W$

The other pixels of the constellation in FIG. 5, pixel A 508, pixel B 510, pixel C 504, and pixel D 506, which may be used to create the output pixel O 502, may then be referenced with respect to the location of output pixel O 502.

$A = Y_A = Y(t-1,i,j)$ $B = Y_B = Y(t+1,i,j)$ $C = Y_C = Y(t,i-1,j)$ $D = Y_D = Y(t,i+1,j)$

A motion adaptive deinterlacer creates an estimated value of output pixel O 502 by determining how much "motion" is present. Motion in this context refers to a pixel in a given spatial location changing over time. The motion may be due to, for example, objects moving or lighting conditions changing. It may be determined that there is little or no motion, then the best estimate for output pixel O 502 would be provided by pixel A 508 and pixel B 510, which is known as "weave" in graphics terminology. On the other hand, it may be determined that there is significant motion, then pixel A 508 and pixel B 510 no longer provide a good estimate for output pixel O 502. In this case, a better estimate would be provided by pixel C 504 and pixel D 506, which is known as "bob" in graphics terminology. This yields the following equations:

$$O = \frac{A+B}{2} \text{ when motion is small (temporal average/weave)}$$

$$O = \frac{C+D}{2} \text{ when motion is large (spatial average/bob)}$$

And motion may be determined by the following equation:

motion=abs(A−B)

If the values of pixel A 508 and B 510 were similar, the value determined for the motion would be small. If the values of pixel A 508 and B 510 were not very similar, the value determined for the motion would be large. The value determined for the motion may then be compared to a motion threshold to determine whether a temporal average or a spatial average approach is appropriate when determining the value of output pixel O 502.

In practice, the decision of using the threshold between the two approximations for output pixel O 502 may be visible in areas where one pixel may choose one method and an adjacent pixel may choose the other. Additionally, using only pixel A 508 and B 510 to determine motion may result in missing motion in certain situations such as, for example, when objects have texture and move at such a rate that the same intensity from the texture lines up with both pixel A 508 and B 510 repeatedly over time—the object may be moving, but as seen with the blinkered view of just examining the intensity at pixel A 508 and B 510, the motion may not be seen. This is known as "motion aliasing" and results in a weave or temporal averaging being performed when the situation may actually require a bob or spatial averaging.

Figure 6A:
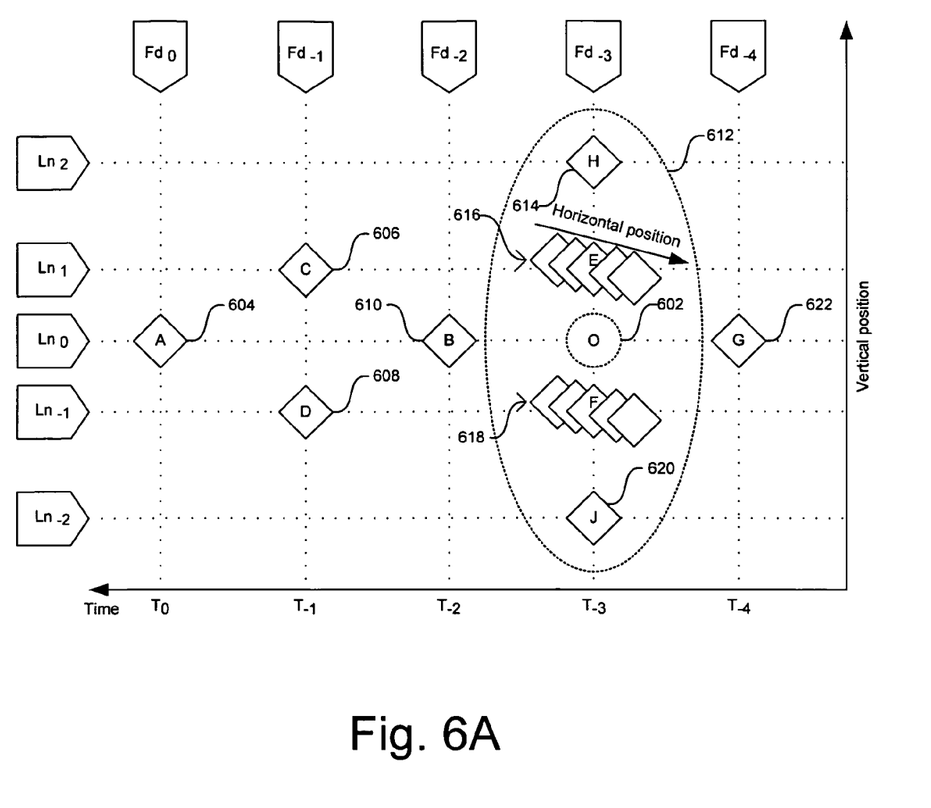
FIG. 6A illustrates an exemplary pixel constellation, in accordance with an embodiment of the present invention.

FIG. 6A illustrates an exemplary pixel constellation, in accordance with an embodiment of the present invention. Referring to FIG. 6A, the pixel constellation may comprise a plurality of pixels 612 in current output field $Fd_{-3}$, a pixel (A) 604 in present line $Ln_0$ of input field $Fd_0$, a pixel (C) 606 in present line $Ln_1$ of field $Fd_{-1}$, a pixel (D) 608 in present line $Ln_{-1}$ of field $Fd_{-1}$, a pixel (B) 610 in present line $Ln_0$ of field $Fd_{-2}$, and a pixel (G) 622 in present line $Ln_0$ of field $Fd_{-4}$. The plurality of pixels 612 in field $Fd_{-3}$ may comprise an output pixel (O) 602 in absent line $Ln_0$, a pixel (H) 614 in present line $Ln_2$, a plurality of pixels (E) 616 in present line $Ln_1$, a plurality of pixels (F) 618 in present line $Ln_{-1}$, and a pixel (J) 620 in present line $Ln_{-2}$.

Figure 6B:
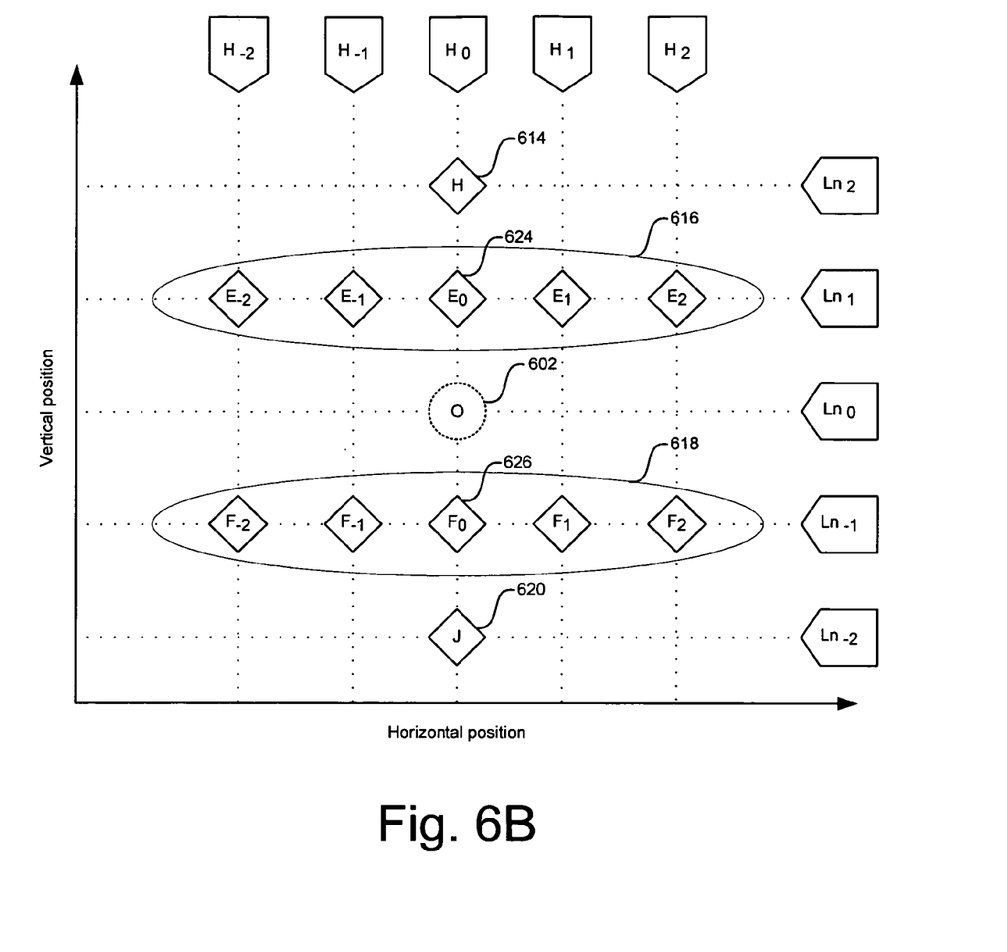
FIG. 6B illustrates exemplary positioning of constellation pixels in the current output frame, in accordance with an embodiment of the present invention.

FIG. 6B illustrates an exemplary positioning of constellation pixels in the current output frame, in accordance with an embodiment of the invention. Referring to FIG. 6B, the plurality of pixels E 616 in present line $Ln_1$, may comprise a pixel $E_0$ 624 immediately above the output pixel O 602, a pixel $E_{-1}$ and a pixel $E_{-2}$ to the left of the pixel $E_0$ 624, and a pixel $E_1$ and a pixel $E_2$ to the right of the pixel $E_0$ 624. Additional pixels to the right and left of pixel $E_0$ 624 may be used. Moreover, additional pixels may be used with pixel (H) 614 in present line $Ln_2$. The plurality of pixels F 618 in present line $Ln_{-1}$ may comprise a pixel $F_0$ 626 immediately below the output pixel O 602, a pixel $F_{-1}$ and a pixel $F_{-2}$ to the left of the pixel $F_0$ 626, and a pixel $F_1$ and a pixel $F_2$ to the right of the pixel $F_0$ 626. Additional pixels to the right and left of pixel $F_0$ 626 may be used. Moreover, additional pixels may be used with pixel (J) 620 in present line $Ln_{-2}$.

The pixel constellation shown in FIG. 6A and FIG. 6B may reduce the occurrence of motion aliasing by using information from additional fields. In an embodiment of the present invention, the constellation may also improve spatial averaging by including additional horizontal pixels, for example, the plurality of pixels E 616 and the plurality of pixels F 618 in present lines $L_1$ and $L_{-1}$ of field $Fd_{-3}$, when determining the value of output pixel O 602. In an embodiment of the present invention, time, $T_0$ is shown on the left; and fields to the right of $T_0$ are back in time from that reference point.

The following equations define a shorthand notation used hereinafter:

$$A=Y_A=Y(t,i,j)$$

$$B=Y_B=Y(t-2,i,j)$$

$$G=Y_G=Y(t-4,i,j)$$

$$C=Y_C=Y(t-1,i-1,j)$$

$$D=Y_D=Y(t-1,i+1,j)$$

$$E_k=Y_{E_k}=Y(t-3,i-1,j+k) \text{ for } -2 \leq k \leq 2$$

$$H=Y_H=Y(t-3,i-3,j)$$

$$F_k=Y_{F_k}=Y(t-3,i+1,j+k) \text{ for } -2 \leq k \leq 2$$

$$J=Y_J=Y(t-3,i+3,j)$$

For example, with reference to the pixel constellation given in FIG. 6A and FIG. 6B, pixel A 604 may represent the value of luma (Y) at given row or vertical position i, column or horizontal position j, and field time t. The row or vertical position i may also refer to the line in the field. The other pixels in the constellation may be positioned relative to pixel A 604. For example, pixel G 622 is located at the same row and column as pixel A 604 but in a field that occurred four fields prior to the field with pixel A 604.

In an embodiment of the present invention, the current motion, $m_a$, around the output pixel O 602 may be determined using pixels A 604 through G 622 according to the following equations, in which only $E_0$ and $F_0$ may be used from the plurality of pixels E 616 and the plurality of pixels F 618 since they have the same horizontal position as the other pixels in the constellation:

$$m_t=\text{MAX}<A,B,G>-\text{MIN}<A,B,G>$$

$$m_s=\text{MIN}<|E_0-C|,|F_0-D|>$$

$$m_a=\text{MAX}<M_t,m_s>$$

where $m_t$ is the current temporal motion and $m_s$ is the current spatial motion. The pattern of pixels used with the MAX and MIN functions may maximize the amount of motion which is detected to prevent motion aliasing and may provide a localized region of detection so that video containing mixed still and moving material may be displayed as stable, non-jittering pictures.

The current motion, $m_a$, for the output pixel O 602 may be stored so that it may be retrieved for use in determining a final motion, $m_f$, value for an output pixel in a field that may occur after the current field. The current motion, $m_a$, rather than the final motion, $m_f$, is used to prevent an infinite loop. The current motion, $m_a$, may be quantized before storage to reduce the memory requirements of the MAD-3:2 102 and/or the memory 106. The number of quantization bits and the range that may be assigned to each of the plurality of quantization levels may be programmable. When the current motion value lies on a quantization level boundary, the current motion value may be assigned, for example, to the lower quantization number so as to err on the side of still. Quantization may also be performed by a look-up table where, for example, the current motion value may be mapped to a programmable quantized value in the look-up table. The following is an exemplary 2-bit quantization for an 8-bit motion value using quantization level ranges:

$$Q_{out} = \begin{cases} 2'b00 & \text{when } 0 \leq m_a < 16 \\ 2'b01 & \text{when } 16 \leq m_a < 64 \\ 2'b10 & \text{when } 64 \leq m_a < 128 \\ 2'b11 & \text{when } 128 \leq m_a < 256 \end{cases}$$

where $Q_{out}$ corresponds to the quantized version of $m_a$.

Figure 7:
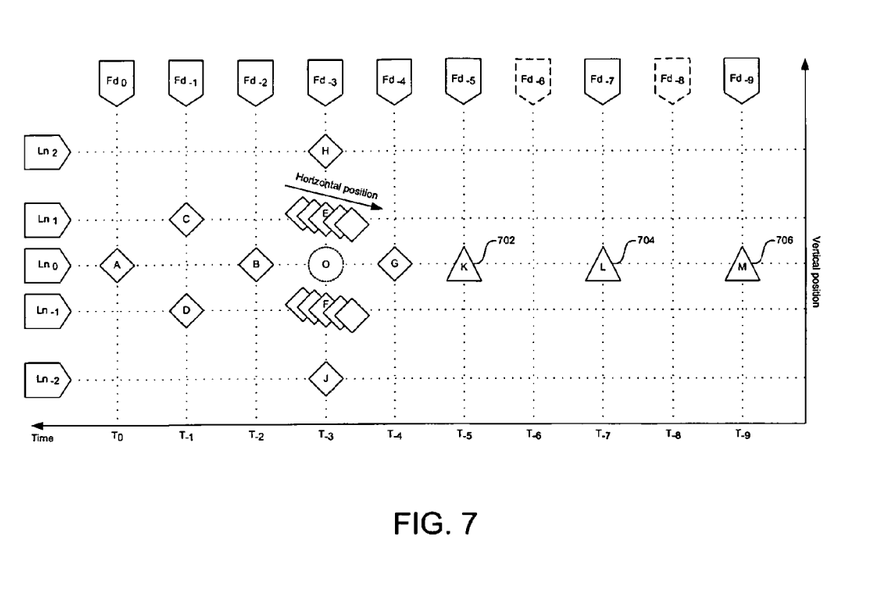
FIG. 7 illustrates an exemplary pixel constellation with locations for quantized historical current motion values, in accordance with an embodiment of the present invention.

FIG. 7 illustrates an exemplary pixel constellation with locations for quantized historical current motion values, in accordance with an embodiment of the present invention. Referring to FIG. 7, locations K 702, L 704, and M 706 are not actual pixels, but instead, they represent the spatial and temporal locations of historical current motion values that may be used to determine the value of output pixel O 602. These historical current motion values may have been quantized before storage. In this embodiment, the gaps in historical current motion information at field $Fd_{-6}$ and field $Fd_{-8}$ result from including historical current motion information from fields of the same type (top/bottom) as the current output field. The coefficient Q may be used to correspond to a quantized version of the historical determination of current motion at that spatial/temporal location. The choice to use a quantized representation of the motion allows for an increased range in time when determining motion, with minimal cost in gates or bandwidth. The benefit being improved quality due to a reduced occurrence of motion aliasing.

The following equations may be used to define a shorthand notation used hereinafter to indicate the position of locations K 702, L 704, and M 706 relative to pixel A 604:

$$K=Q_K=Q(t-5,i,j)$$

$$L=Q_L=Q(t-7,i,j)$$

$$M=Q_M=Q(t-9,i,j)$$

where $Q_K$, $Q_L$, and $Q_M$ correspond to the quantized version of the historical current motion values at locations K 702, L 704, and M 706 respectively.

The quantized historical motion value for use in determining the value of the output pixel O 602 may be given by $Q_h=\text{MAX}<K,L,M>$, where if the values of K 702, L 704, and M 706 are, for example, 2-bit quantized numbers, then the value of $Q_h$ will also be a 2-bit quantized number. In another embodiment of the invention, the quantized historical motion value may be determined from a weighted sum of the quantized historical current motion values for locations K 702, L 704, and M 706, where the weighing coefficients may be used, for example, to provide a bias towards more recent results. An example of a weighted sum may be as follows:

$$Q_h=a_K K+b_L L+c_M M$$

where $a_K$, $b_L$, and $c_M$ are the coefficients for the quantized historical current motion values in locations K 702, L 704, and M 706 respectively.

The mapping of the quantized historical motion value, $Q_h$, to a historical motion value, $m_h$, may be programmable and may be based on a look-up table. The bit precision of the historical motion value may also be programmable. For example, a conversion from the 2-bit quantized historical value for output pixel O 602, $Q_h$, to a 7-bit historical motion value, $m_h$, may be as follows:

$$m_h = \begin{cases} 0 & \text{when } Q_h = 2'b00 \\ 16 & \text{when } Q_h = 2'b01 \\ 64 & \text{when } Q_h = 2'b10 \\ 128 & \text{when } Q_h = 2'b11 \end{cases}$$

The final motion, $m_f$, for output pixel O 602 may be determined from the current motion, $m_a$, and the historical motion, $m_h$, as follows:

$$m_f = \text{MAX} < m_a, m_h >$$

The estimated luma value, $O_Y$, for output pixel O 602 may be determined as follows:

$$T_a = \frac{A+B}{2}$$
$$S_a = \frac{A+B}{2}$$
$$X = T_a$$
$$Y = S_a$$
$$M = m_f$$
$$Z = Y - X$$
$$M_L = \text{MAX}\{\text{MIN}\langle M, Z\rangle, -M\}$$
$$O_Y = X + M_L$$

where $T_a$ is the temporal average approximation, $S_a$ is the spatial average approximation, X and Y represent the two approximations which may be used for output pixel O 602, Z is the range of values for output pixel O 602, M is the measure of motion which indicates where within the range Z the value of the output pixel O 602 will be, $M_L$ is the limited value of M so that it does not extend beyond the value of Y, and $O_Y$ is the motion-adapted luma value of output pixel O 602.

Figure 8:
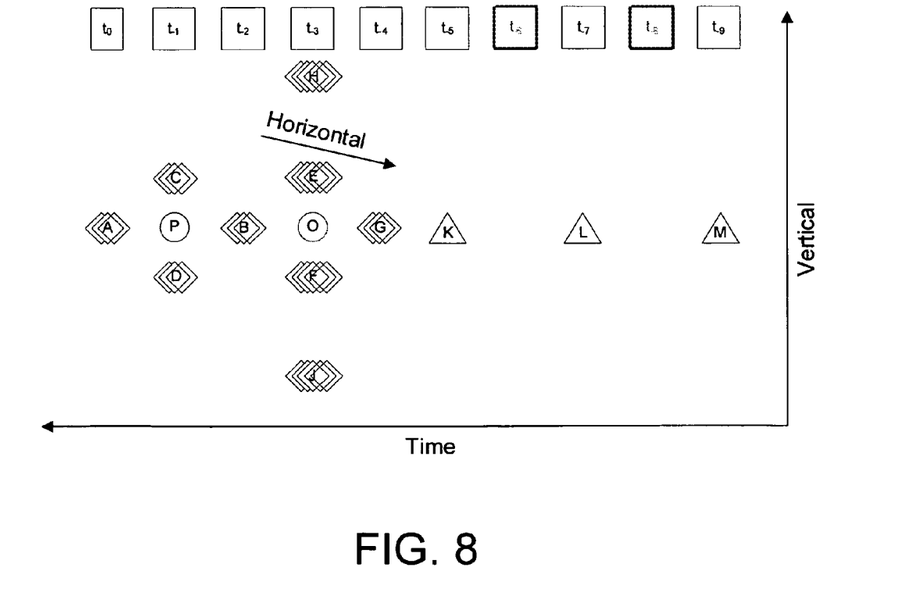
FIG. 8 is a diagram illustrating an exemplary pixel constellation that may be utilized for motion adaptive deinterlacing with inverse telecine (MAD-IT), in accordance with an embodiment of the present invention.

FIG. 8 is a diagram illustrating an exemplary pixel constellation that may be utilized for motion adaptive deinterlacing with inverse telecine (MAD-IT), in accordance with an embodiment of the invention.

The exemplary pixel constellation of FIG. 8 is an extension of the pixel constellation for MAD-3:2 as disclosed in FIGS. 5-7, in addition to the horizontal cluster of pixels E and F, by also considering pixels horizontally to the left and right at pixels C, D, H and J. In an exactly analogous manner, and in addition to the spatiotemporal definitions of the pixels in MAD-3:2, the new pixel clusters for luma are defined as:

$$C_k = Y_{C_k} = Y(t-1, i-1, j+k) \text{ for } -1 \leq k \leq 1$$

$$D_k = Y_{D_k} = Y(t-1, i+1, j+k) \text{ for } -1 \leq k \leq 1$$

$$H_k = Y_{H_k} = Y(t-3, i-3, j+k) \text{ for } -2 \leq k \leq 2$$

$$J_k = Y_{J_k} = Y(t-3, i+3, j+k) \text{ for } -2 \leq k \leq 2$$

Pixel "O", as in MAD-3:2, is the absent pixel that is currently being estimated and output in the execution phase. Pixel "P" can be thought of as being the absent pixel estimated in the detection phase. It is not output from the deinterlacer but used internally in a bad-weave detector. In two fields' time, that same pixel will reach the execution phase and be re-estimated and output.

Motion in MAD-3:2

With reference to FIG. 1, the present motion in MAD-3:2 is effectively given by:

$$m_t = \text{MAX} < A_0, B_0, G_0 > - \text{MIN} < A_0, B_0, G_0 >$$

$$m_s = \text{MIN} < |E_0 - C_0|, |F_0 - D_0| >$$

$$m_a = \text{MAX} < m_t, m_s >$$

Motion in MAD-IT

In MAD-IT, the temporal and spatial motion components are selectable. Default register values may be utilized, which may result in the same value for motion as in MAD-3:2. In some applications the default (or MAD-3:2) motion may be too slow in switching between spatial motion and temporal motion. The slowness results from the fact that in MAD-3:2, pixel constellation including the quantized motion fields span 10 fields. As a result it can take 10 field times to switch from a scene that may contain a lot of motion to a scene that is static to process through the constellation and output pixels that may no-longer be affected by the motion and weave as required. This 10 field delay may be perceived as slow depending on the application.

Motion calculation in MAD-IT provides an alternative motion calculation where the spatial motion calculation is more sensitive to spatial motion. A system user may select whether a certain application requires less or more sensitivity to spatial motion. By using boosted spatial and/or temporal present motion calculations provided as an option by the MAD-IT, the motion aliasing that may result in the MAD-3:2 may be reduced. The MAD-IT may utilize fewer quantized motion fields, which may be activated to accelerate the response of the deinterlacer when switching from a scene with motion to one that is still.

| Spatial Motion Mode Select | Value | Spatial (vertical) motion calculation |
|---|---|---|
| Normal | 0 (default) | $m_s = \text{MIN} < |E_0 - C_0|, |F_0 - D_0| >$ |
| Boost1 | 1 | $m_s = \text{MAX} < |E_0 - C_0|, |F_0 - D_0| >$ |
| Reserved | 2 | — |
| Reserved | 3 | — |

Similarly, the temporal motion in the MAD-IT provides alternatives from which a user may select a desired level of sensitivity to temporal motion. The default choice is the same as the calculation of temporal motion in the MAD-3:2, and the additional choices may utilize pixels to the right and pixels to the left of the pixels used in calculation the default temporal motion to get additional levels of sensitivity to temporal motion.

$$m_{t0} = \text{MAX} < A_0, B_0, G_0 > - \text{MIN} < A_0, B_0, G_0 >$$

$$m_{tm1} = \text{MAX} < A_{-1}, B_{-1}, G_{-1} > - \text{MIN} < A_{-1}, B_{-1}, G_{-1} >$$

$$m_{t1} = \text{MAX} < A_1, B_1, G_1 > - \text{MIN} < A_1, B_1, G_1 >$$

| Temporal Motion Mode Select | Value | Temporal |
| --- | --- | --- |
| Normal | 0 (default) | $m_t = m_{t0}$ |
| Boost1 | 1 | $m_t = \text{MAX}<m_{t0}, \text{MIN}(m_{tm1}, m_{t1})>$ |
| Boost2 | 2 | $m_t = \text{MAX}<m_{t0}, m_{tm1}, m_{t1}>$ |
| Reserved | 3 | — |

Once the values have been determined, once again:

$$m_a = \text{MAX}<m_t, m_s>$$

Figure 9:
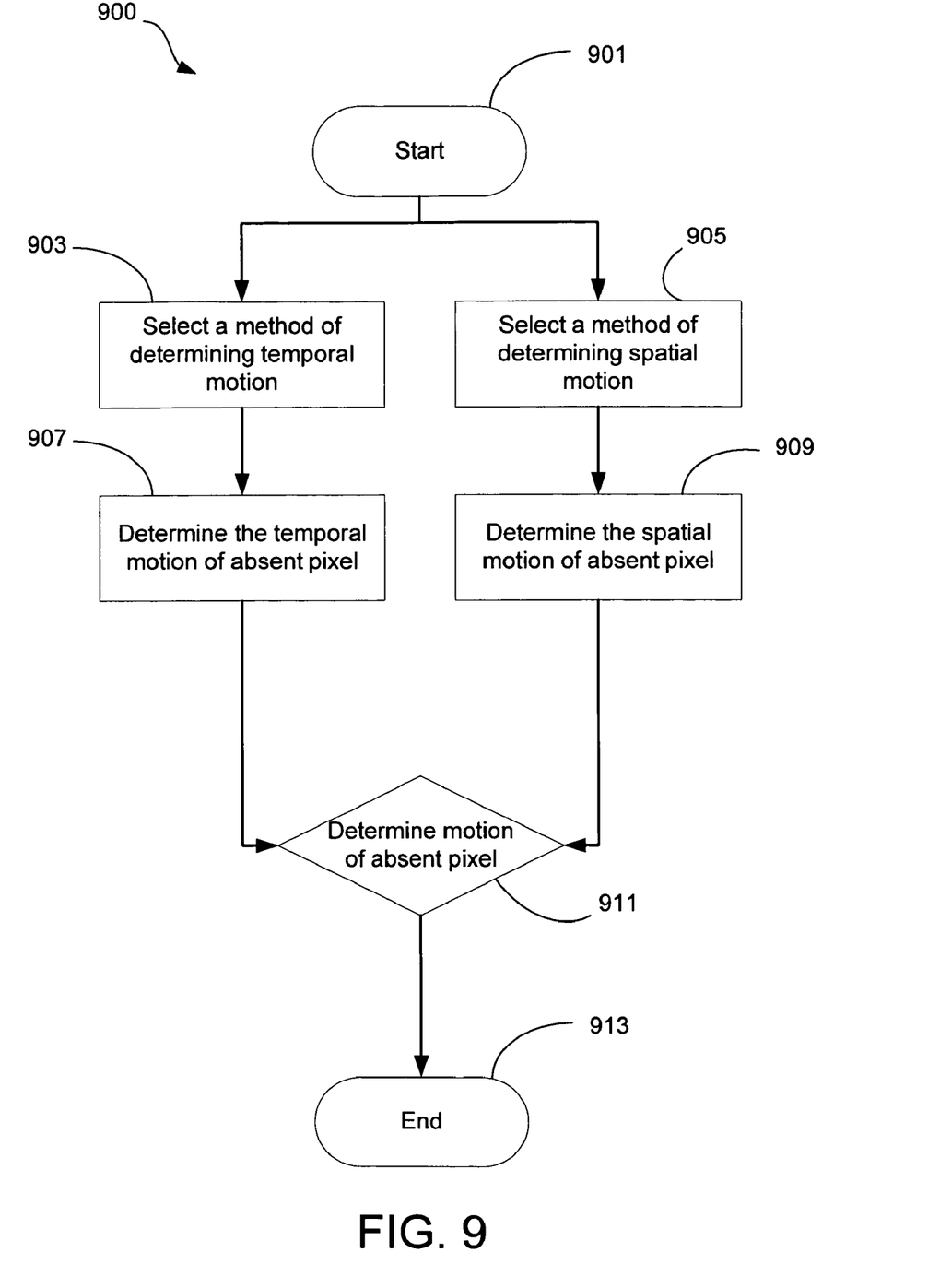
FIG. 9 illustrates a flow diagram of an exemplary method for determining the motion of an absent pixel, in accordance with an embodiment of the present invention.

FIG. 9 illustrates a flow diagram of an exemplary method 900 for determining the motion of an absent pixel, in accordance with an embodiment of the present invention. The method may begin at a start block 901, where the video information relevant to the absent pixel may be received. At a next block 903, a method of determining temporal motion of the absent pixel may be selected, and at a next block 907, the selected method may be used to determine the temporal motion of the absent pixel. Additionally, following the start block 901, at a next block 905, a method of determining spatial motion may be selected, and at a next block 909, the selected method may be used to determine the spatial motion of the absent pixel. The determined spatial motion and the determined temporal motion may then be compared at a next block 911, and one of them may be selected as the motion estimate of the absent pixel. For example, the larger of the two determined motions may be selected as the motion estimate for the absent pixel. The method may then end at an end block 913, where the selected motion may continue within a video network system to be used in further video decoding processes. The method 900 may be performed by hardware, software, or a combination thereof. In an embodiment of the present invention, a deinterlacer system such as, for example, the deinterlacer system 100 of FIG. 1 may perform the method 900 of FIG. 9.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that determines motion information of an absent pixel in a current video image, the method comprising:
   selecting a first method to determine spatial motion of an absent pixel;
   determining the spatial motion of the absent pixel;
   selecting a second method to determine temporal motion of the absent pixel;
   determining the temporal motion of the absent pixel; and
   determining the motion of the absent pixel utilizing the determined spatial motion and the determined temporal motion of the absent pixel;
   wherein the first method comprises utilizing a plurality of pixels in a line immediately above and a line immediately below the absent pixel wherein the plurality of pixels comprise:
   a first pixel immediately above the absent pixel;
   a second pixel at the same location as the first pixel in a video image prior to the current video image;
   a third pixel immediately below the absent pixel; and
   a fourth pixel at the same location as the third pixel in a video image prior to the current video image.

2. The method according to claim 1 wherein the first method comprises:
   determining a first value comprising the minimum of the difference between the first and second pixels and the difference between the third and fourth pixels; and
   determining a second value comprising the maximum of the difference between the first and second pixels and the difference between the third and fourth pixels.

3. The method according to claim 2 wherein the first method further comprises selecting one of the first and second value based on a selected level of sensitivity to motion.

4. The method according to claim 1 wherein the second method comprises utilizing a plurality of pixels in the same location as the absent pixel from video images prior to and subsequent to the current video image.

5. The method according to claim 4 wherein the plurality of pixels comprise:
   a first pixel from a first video image immediately subsequent to the current video image;
   a second pixel from a second video image immediately prior to the current video image; and
   a third pixel from a video image prior to the second video image.

6. The method according to claim 5 wherein the plurality of pixels further comprise:
   a fourth pixel immediately to the left of the first pixel;
   a fifth pixel immediately to the left of the second pixel;
   a sixth pixel immediately to the left of the third pixel;
   a seventh pixel immediately to the right of the first pixel;
   an eighth pixel immediately to the right of the second pixel; and
   a ninth pixel immediately to the right of the third pixel.

7. The method according to claim 6 wherein the second method comprises:
   determining a first value comprising the difference between the maximum and the minimum of the first, second, and third pixels;

determining a second value comprising the difference between the maximum and the minimum of the fourth, fifth, and sixth pixels; and determining a third value comprising the difference between the maximum and the minimum of the seventh, eighth and ninth pixels.

8. The method according to claim 7 wherein the second method further comprises selecting a combination of the first, second and third values based on a selected level of sensitivity to motion.

9. A system that determines motion information of an absent pixel in a current video image, the system comprising:
at least one processor capable of selecting a first method to determine spatial motion of an absent pixel;
the at least one processor capable of determining the spatial motion of the absent pixel;
the at least one processor capable of selecting a second method to determine temporal motion of the absent pixel;
the at least one processor capable of determining the temporal motion of the absent pixel; and
the at least one processor capable of determining the motion of the absent pixel utilizing the determined spatial motion and the determined temporal motion of the absent pixel;
wherein the first method comprises utilizing a plurality of pixels in a line immediately above and a line immediately below the absent pixel, wherein the plurality of pixels comprises:
a first pixel immediately above the absent pixel;
a second pixel at the same location as the first pixel in a video image prior to the current video image;
a third pixel immediately below the absent pixel; and
a fourth pixel at the same location as the third pixel in a video image prior to the current video image.

10. The system according to claim 9 wherein the first method comprises:
determining a first value comprising the minimum of the difference between the first and second pixels and the difference between the third and fourth pixels; and
determining a second value comprising the maximum of the difference between the first and second pixels and the difference between the third and fourth pixels.

11. The system according to claim 10 wherein the first method further comprises selecting one of the first and second value based on a selected level of sensitivity to motion.

12. The system according to claim 9 wherein the second method comprises utilizing a plurality of pixels in the same location as the absent pixel from video images prior to and subsequent to the current video image.

13. The system according to claim 12 wherein the plurality of pixels comprise:
a first pixel from a first video image immediately subsequent to the current video image;
a second pixel from a second video image immediately prior to the current video image; and
a third pixel from a video image prior to the second video image.

14. The system according to claim 13 wherein the plurality of pixels further comprise:
a fourth pixel immediately to the left of the first pixel;
a fifth pixel immediately to the left of the second pixel;
a sixth pixel immediately to the left of the third pixel;
a seventh pixel immediately to the right of the first pixel;
an eighth pixel immediately to the right of the second pixel; and
a ninth pixel immediately to the right of the third pixel.

15. The system according to claim 14 wherein the second method comprises:
determining a first value comprising the difference between the maximum and the minimum of the first, second, and third pixels;
determining a second value comprising the difference between the maximum and the minimum of the fourth, fifth, and sixth pixels; and
determining a third value comprising the difference between the maximum and the minimum of the seventh, eighth and ninth pixels.

16. The system according to claim 15 wherein the second method further comprises selecting a combination of the first, second and third values based on a selected level of sensitivity to motion.

17. A machine-readable storage having stored thereon, a computer program having at least one code section that determines motion information of an absent pixel in a current video image, the at least one code section being executable by a machine for causing the machine to perform steps comprising:
selecting a first method to determine spatial motion of an absent pixel;
determining the spatial motion of the absent pixel;
selecting a second method to determine temporal motion of the absent pixel;
determining the temporal motion of the absent pixel; and
determining the motion of the absent pixel utilizing the determined spatial motion and the determined temporal motion of the absent pixel, wherein the first method comprises code for utilizing a plurality of pixels in a line immediately above and a line immediately below the absent pixel, wherein the plurality of pixels comprise:
a first pixel immediately above the absent pixel;
a second pixel at the same location as the first pixel in a video image prior to the current video image;
a third pixel immediately below the absent pixel; and
a fourth pixel at the same location as the third pixel in a video image prior to the current video image.

18. The machine-readable storage according to claim 17 wherein the first method comprises:
code for determining a first value comprising the minimum of the difference between the first and second pixels and the difference between the third and fourth pixels; and
code for determining a second value comprising the maximum of the difference between the first and second pixels and the difference between the third and fourth pixels.

19. The machine-readable storage according to claim 18 wherein the first method further comprises code for selecting one of the first and second value based on a selected level of sensitivity to motion.

20. The machine-readable storage according to claim 17 wherein the second method comprises code for utilizing a plurality of pixels in the same location as the absent pixel from video images prior to and subsequent to the current video image.

21. The machine-readable storage according to claim 20 wherein the plurality of pixels comprise:
a first pixel from a first video image immediately subsequent to the current video image;
a second pixel from a second video image immediately prior to the current video image; and
a third pixel from a video image prior to the second video image.

22. The machine-readable storage according to claim 21 wherein the plurality of pixels further comprise:

a fourth pixel immediately to the left of the first pixel;
a fifth pixel immediately to the left of the second pixel;
a sixth pixel immediately to the left of the third pixel;
a seventh pixel immediately to the right of the first pixel;
an eighth pixel immediately to the right of the second pixel; and
a ninth pixel immediately to the right of the third pixel.

23. The machine-readable storage according to claim 22 wherein the second method comprises:
code for determining a first value comprising the difference between the maximum and the minimum of the first, second, and third pixels;
code for determining a second value comprising the difference between the maximum and the minimum of the fourth, fifth, and sixth pixels; and
code for determining a third value comprising the difference between the maximum and the minimum of the seventh, eighth and ninth pixels.

24. The machine-readable storage according to claim 23 wherein the second method further comprises code for selecting a combination of the first, second and third values based on a selected level of sensitivity to motion.

* * * * *